United States Patent [19]

Lauterbach

[11] Patent Number: 5,437,691
[45] Date of Patent: Aug. 1, 1995

[54] PRODUCTION OF SPHERICAL SHAPED PRODUCTS OF SUBLIMING SUBSTANCES

[75] Inventor: Armin Lauterbach, Antofagasta, Chile

[73] Assignee: Chilean Nitrate Corporation, Norfolk, Va.

[21] Appl. No.: 752,716

[22] Filed: Aug. 30, 1991

[51] Int. Cl.⁶ .................... B01D 9/00; C01B 7/14
[52] U.S. Cl. ................. 23/295 R; 23/313 R; 264/13; 423/500
[58] Field of Search .............. 23/295 R, 313 R; 423/505, 500; 264/13; 422/245.1

[56] References Cited

U.S. PATENT DOCUMENTS

| | | | |
|---|---|---|---|
| 2,214,838 | 9/1940 | McGavock | 23/87 |
| 2,811,748 | 11/1957 | Smith | 18/47.2 |
| 3,056,671 | 10/1962 | Winants et al. | 71/64 |
| 3,058,159 | 10/1962 | Ishizuka et al. | 18/47.2 |
| 3,231,640 | 1/1966 | Klopf | 264/13 |
| 3,334,159 | 8/1967 | Campbell | 264/13 |
| 3,550,195 | 12/1970 | Campbell | 18/2.7 |
| 3,578,433 | 5/1971 | Bottai et al. | 71/1 |
| 3,997,636 | 12/1976 | Bennett | 264/7 |
| 4,213,924 | 7/1980 | Shirley, Jr. | 264/7 |
| 4,552,566 | 11/1985 | Kita et al. | 23/313 R |

FOREIGN PATENT DOCUMENTS

| | | | |
|---|---|---|---|
| 1129164 | 8/1982 | Canada | 264/13 |
| 0064311 | 11/1982 | European Pat. Off. | |
| 1300513 | 8/1969 | Germany | |
| 2518848 | 11/1975 | Germany | 264/13 |
| 48-46593 | 7/1973 | Japan | |
| 52-6672 | 2/1977 | Japan | |
| 53-102291 | 9/1978 | Japan | |
| 61-31304 | 2/1986 | Japan | |
| 981878 | 1/1965 | United Kingdom | |
| 1459781 | 12/1976 | United Kingdom | |
| 856484 | 9/1981 | U.S.S.R. | |

Primary Examiner—John Zimmerman
Assistant Examiner—Timothy C. Vanoy
Attorney, Agent, or Firm—Pennie & Edmonds

[57] ABSTRACT

A method for the production of spherically shaped granules of low melting point, corrosive, subliming substances which comprises melting the substance and discharging the melt through a perforated bottom receiver and into a prilling tower in the form of a plurality of streams having diameters of 0.5 to 4.0 mm which form droplets as they fall through the tower. The prilling tower has 10 to 20 mm diameter lateral perforations through each of which a mixture of air and an atomized liquid, with a lower boiling point than the melting point of the subliming substance, is introduced to form a mist. The mist is cooled below the atmospheric temperature and transformed into a low temperature fog which minimizes sublimation. The droplets are solidified as they pass through the fog during their fall through the tower and form granules having a diameter of 0.5 to 4.0 mm which are received on a curved screen to prevent breakage.

8 Claims, 1 Drawing Sheet

PRODUCTION OF SPHERICAL SHAPED PRODUCTS OF SUBLIMING SUBSTANCES

BACKGROUND OF THE INVENTION

1. Field of the Invention

The present invention relates to a method for the production of spherical shaped granules of low melting point, corrosive, subliming substances, and to an apparatus for minimizing sublimation during their manufacture.

2. Description of Prior Art

The most frequently used granulation processes are: prilling, pan- drum- or fluidized bed- granulation, and compaction granulation. The last two techniques are not of practical value if corrosive and sublimable substances are to be granulated. For this reason only prilling will be analyzed.

Prilling is a well known process which is extensively used in the fertilizer industry for obtaining spherical shaped granules. For instance, this technique is commonly practiced in the saltpeter industry. It can be used if it is possible to melt the material, which, in the molten condition, is discharged into an enclosed space, known as a prilling tower, through nozzles or perforated plates. If the temperature difference between the atmospheric air and the melt is sufficiently high, the droplets can be cooled and solidified solely with the use of a countercurrent air stream. The solid granules are generally received in a chute, or in a liquid, if contamination of the substance with the liquid is not harmful or if the substance is not soluble in the liquid.

If the temperature of the melt is relatively low, or if the height of the prilling tower is limited, cooling can be accelerated by using a spray nozzle on the inside of the enclosed space, which sprays a coolant having a boiling point lower than the melting point of the prilling substance. The liquid spray is directed onto the molten droplets which are thus cooled by means of the latent heat of vaporization of the liquid. This process is described in U.S. Pat. No. 4,552,566.

If the material readily sublimes and the vapors are corrosive, however, a system needs to be developed which minimizes sublimation. Moreover, if the collection of these vapors is an expensive process, sublimation must be kept as low as possible. This has not been achieved by the present state of the art.

SUMMARY OF THE INVENTION

It is thus an object of the present invention to provide a method for minimizing sublimation during the prilling process of corrosive, low melting point, subliming substances.

Another object of the present invention is to provide a method for receiving the prills in such a way as to minimize losses due to granule breakage.

In the present invention, droplets are formed by melting the substance and transferring it into a vessel having a bottom which is perforated with round holes, or having nozzles, with a diameter of 0.5 to 4.0 mm. The melted substance is thereafter fed in streams into the top of a prilling tower which is furnished with a great number of lateral, radially and vertically spaced perforations. Each radial perforation section has 3 to 8 equidistant perforations and is separated 30 to 100 cm from the adjacent vertical perforation sections. These spray nozzles, which atomize the liquid to be used to accelerate cooling and solidification of the prills, are located on the outside of the tower with the tip of each nozzle being spaced at a distance of from 1 to 20 mm from each corresponding tower perforation. As a result of this special layout, the high speed atomized liquid passing from each nozzle through the corresponding tower perforation produces a localized low pressure, drawing with it quantities of the surrounding air to form a mist. In this manner, a mixture of atomized liquid and air is introduced simultaneously at multiple locations around the prilling tower. This intimate mixture of air and liquid results in the evaporation of a certain quantity of the liquid, thus reducing the diameter of the liquid particles, initially between 10 to 200 $\mu$. As a result of this partial evaporation, the incoming mist creates a low temperature fog inside the entire tower, wherein none of the liquid droplets fall to the bottom of the tower.

The degree of temperature drop due to the partial evaporation of the liquid will depend on the air to liquid ratio and on the previous content of vaporized liquid in the air. Thus, with the use of the present invention, it is possible to assure lower temperatures in the main body of the prilling tower which will accelerate cooling of the subliming substance droplet surface and, consequently, diminish its sublimation rate.

At the bottom of the tower, a curved screen having a smaller mesh size than the granule diameter is placed. This screen minimizes the impact force of the prills reaching the bottom of the tower, resulting in a reduction in the quantity of broken prills. The screen also serves the purpose of permitting passage of droplets of cooling liquid that could be formed by coalescence in the tower body, thus permitting formation of the prills of the subliming substance substantially without contamination by the cooling liquid.

The working principle of the present invention is thus different from the prior art in the sense that the atomized cooling liquid which is introduced into the prilling tower does not have any directional orientation. That is, its main purpose is to provide the tower with an atmosphere of a cold fog flowing upwardly countercurrently with respect to the droplets of the subliming substance. This low temperature fog atmosphere is attained by partially evaporating the incomming liquid mist particles, by an adiabatic process which drastically drops their temperature and reduces the liquid particle diameter below its incoming size, thus forming a fog. In contrast, in the prior art, the liquid spray is directed onto the subliming substance particles at certain precise locations, and fundamentally, only the liquid droplets contacting the subliming substance will evaporate.

DETAILED DESCRIPTION OF THE INVENTION

Figure 1:
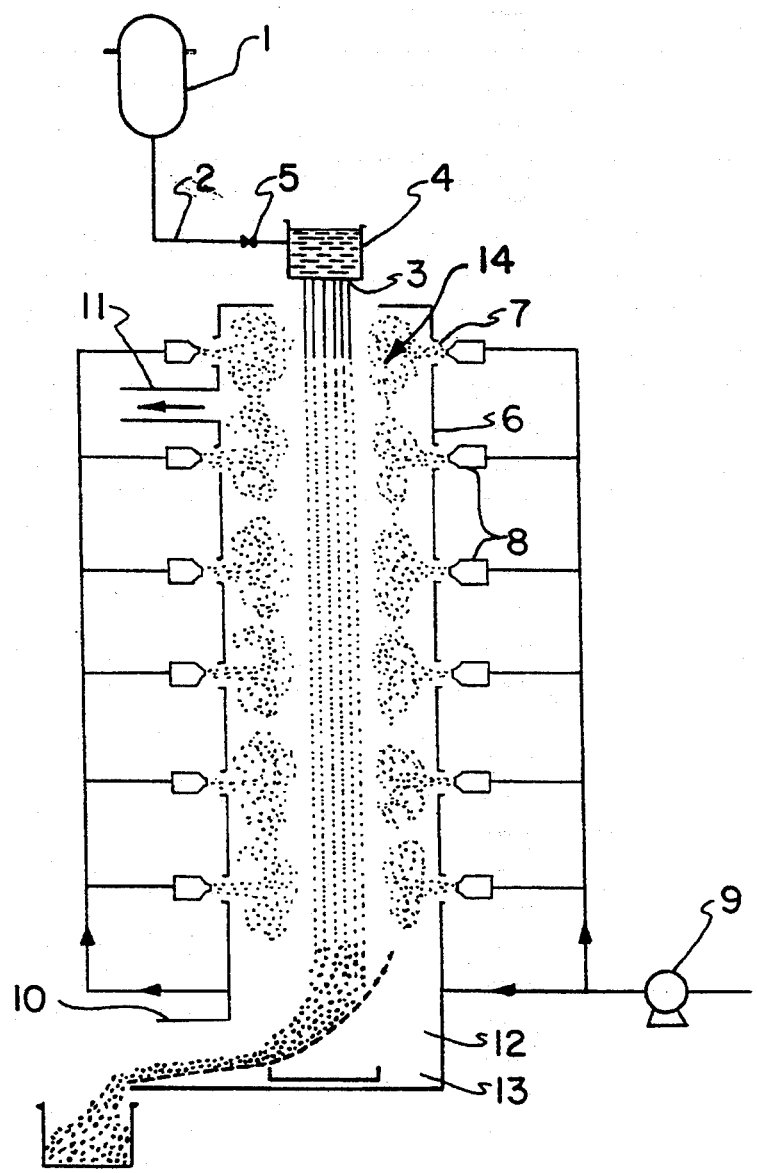
FIG. 1 is a diagram showing a sectional view of the apparatus of the invention.

A subliming substance, such as iodine, is melted in a melting pot 1 and fed through pipe 2 into vessel 4 having a perforated bottom or nozzles 3. The level of molten substance in the vessel 4 is held constant by valve 5 so as to maintain a constant flow through its bottom. The streams of molten substance then enter the laterally perforated tower 6 through an upper central part thereof. At a distance from the bottom of vessel 4, the streams are transformed in falling droplets.

At the outside of the tower nozzles 8 are located in front of each of the perforations 7, atomizing into the inside of the tower a mist formed by liquid having a lower boiling point than the melting point of the subliming substance. The liquid is pressurized by pump 9. Due to the high speed the sprayed mist has at the tower entrance, a pressure drop is generated at each perforation 7, drawing a quantity of outside air into the tower. The mixing of the mist with additional air is adiabatic. Therefore, a cooling effect occurs due to the partial evaporation of the droplets forming the mist, which results in a reduction in the particle size of these droplets, thus forming a low temperature fog 14. Hence, the inside temperature of the whole tower is reduced which enhances the cooling of the molten substance passing through the cooled fog.

Additional air is introduced countercurrently through pipe 10 at the bottom of the tower. The mixture of low temperature fog and vapors of the subliming substance are extracted through pipe 11, and processed further to recover the subliming substance.

The cooled and solidified granules are received on a screen 12 free from cooling liquid, which is curved to minimize the impact force of the granules on its surface. The screen has a smaller mesh size than the granule diameter, but permits the passage of coalesced droplets which may form from the fog, thus separating the granules from these droplets. The droplets are collected in a tray 13.

The advantages of the invention include the enhancement of the cooling effect due to a better mix of fresh air and cooling liquid, and the evenly distributed cooling environment throughout the tower due to the placement of the nozzles 8 and the turbulence produced by the additional air introduced at its bottom. This effect creates a much lower temperature foggy atmosphere with a higher cooling capacity than is available in prior art structures and, results therefore, in a lower sublimation rate.

Moreover, this invention uses equipment having a collecting means for the granules with no moving parts which permits one to obtain the granulated product free of cooling liquid contamination. Furthermore, the design of the curved collecting means minimizes the breakage of the granules due to impact.

The higher sublimation loss produced by the prior art systems results from the fact that a greater part of the cooling effect is due to the sublimation of the substance itself, rather than from the air and the cooling liquid which evaporates after contacting the droplets of the subliming substance. This is due to the fact that the prior art processes using an additional liquid cooling medium besides air, introduce the liquid 1) through the inside of the tower and 2) only at the upper or at the upper and lower part of the tower. Therefore, the cooling action of the liquid is basically circumscribed to that portion of the tower in which the spraying device is located.

Hereinbelow the invention is described in more detail by way of a non-limiting example.

Iodine is used as the subliming substance, while distilled water is used as the cooling liquid. It is known that iodine is only slightly soluble in water and, therefore, this combination is in accordance with the scope of the invention. Iodine has a melting point of 113.5° C. and water a boiling point of 100° C.

The iodine is melted in a steam jacketed tank 1 having a capacity of about 7000 kg. The temperature inside the tank is kept at between about 113.5° and 125° C. Through pipe 2 the melt is introduced into a ten liter vessel 4 which bottom is provided with twelve nozzles 3, each having a diameter of 0.9 mm. The level of the melt in vessel 4 is held constant at 200 mm by means of valve 5. A flow of 350 g/min per nozzle is maintained. The streams of molten iodine enter the laterally perforated tower 6 through the upper central part. At a distance from the bottom of vessel 4, the streams are transformed into droplets with a diameter of 0.5 to 4.0 mm, which continue falling. Tower 6 is provided with six sets of four circumferentially spaced 20 mm diameter radial perforations 7. The sets are vertically spaced 60 cm apart along the height of the tower. In front of each of the tower perforations 7, at a distance of 20 mm from the tower surface, corresponding nozzles 8 are located. Each of these nozzles atomizes water into the tower at a rate of 80 $cm^3$/min with a particle size of 10 to 200 $\mu$. The temperature inside the tower is up to 15° C. lower than the atmospheric temperature along its entire height.

The water is pressurized to 60-100 psig with pump 9. Because of the high speed of the fine water spray, at the entrance of the tower perforations 7 a pressure drop is created, suctioning outside air into the tower. The consequent mixing of the spray and the air into a mist is an adiabatic process. This process results in a cooling of the mist and a reduction of the diameter of the water particles below their initial size, thus transforming the mist into a low temperature fog 14. The iodine streams and particles falling down through the tower 6 are therefore contacted with the low temperature fog 14. The inside temperature of the entire tower is reduced, enhancing the cooling effect on the molten iodine.

An additional proportion of air is introduced countercurrently from the bottom of tower 6 through pipe 10. In this manner, the remaining fog and iodine vapors are extracted through pipe 11 and processed further to permit recovery of the iodine. The cooled and solidified granules, having a particle size of 0.5 to 4.0 mm, are received on a curved screen 12, thus minimizing the impact force on the surface of the screen. The screen has a mesh size smaller than the granule diameter and its additional purpose is to permit the drops of atomized water, which may be formed due to coalescence of mist droplets to be removed from the tower and received in a tray 13. The granules are therefore obtained in a substantially dry condition.

Under these conditions a maximum of 4% of the incoming iodine streams are sublimed, resulting in a very high prilling yield. Also practically no prills are broken due to the use of curved screen 12.

I claim:
1. A method for producing a granular spherically shaped product of corrosive, subliming substances, which comprises:
 discharging a corrosive subliming substance, in a molten condition, through a perforated surface or through nozzles and into an enclosure, so as to form a plurality of molten streams which transform into droplets of 0.5 to 4.0 mm diameter, said enclosure surrounding said streams and formed droplets and provided around its outer periphery with from 3 to 8 evenly spaced perforations per each meter of height;
 introducing, through a bottom portion of said enclosure, a flow of air into said enclosure, said flow traveling in a direction countercurrent to said streams and formed droplets to facilitate cooling of said corrosive subliming substance;

introducing, at a plurality of said perforations substantially surrounding a substantial portion of the vertical axis of the enclosure, a mist of a liquid coolant having a boiling point lower than the melting point of said corrosive subliming substance, said mist being distributed throughout substantially the entire height of the enclosure in the form of liquid particles atomized to a size of 10 to 200 $\mu$, said mist being introduced from the outside into said enclosure through said perforations so as to be cooled adiabatically by mixing with the external air, wherein said atomized liquid particles are pressurized to achieve a relatively high rate of speed prior to entry into said enclosure to create a localized area of low pressure at each said perforation so as to suction outside air into said enclosure for facilitating said adiabatic cooling, whereupon said mist, in combination with said countercurrent flow of air, is thereafter transformed into a low temperature turbulent fog by partial evaporation of the incoming liquid particles forming said mist before said droplets pass through the fog;

solidifying said droplets of said subliming substance to form spherically shaped particles thereof; and collecting said spherically shaped particles, said spherically shaped particles being substantially free of said liquid coolant.

2. A method for producing a granular, spherical shaped product of corrosive, subliming substances as set forth in claim 1, further including the step of receiving said droplets after solidification on a curved screen, said screen having a smaller mesh size than the diameter of the granules formed from said solid droplets, said screen permitting passage of coalesced drops of said cooling liquid therethrough.

3. A method for producing a granular, spherically shaped product of corrosive, subliming substances as set forth in claim 1, wherein said corrosive subliming substance is iodine.

4. A method for producing granular, spherical shaped produce of corrosive, subliming substances as set forth in claim 1, wherein said liquid coolant is water.

5. An apparatus for producing a spherically shaped product of corrosive, subliming substances, which comprises:
(a) a vertical prilling tower;
(b) means for discharging a plurality of molten streams of a corrosive subliming substance into a top portion of the prilling tower so as to form a plurality of molten droplets having a diameter of from 0.5 to 4.0 mm;
(c) means for introducing, through a bottom portion of said tower, a flow of air into said tower, said flow travelling in a direction countercurrent to said streams and formed droplets to facilitate cooling of said subliming substance;
(d) a plurality of perforations in the prilling tower evenly spaced around substantially the entire outer periphery thereof, surrounding said streams and droplets;
(e) nozzle means for discharging a mist of a liquid coolant from outside said tower through a plurality of said perforations substantially surrounding a substantial portion of the vertical axis of said tower, said mist filling substantially the entire interior of said tower, said nozzle means being aligned with but spaced outwardly from said perforations to permit ambient air to enter said tower through said perforations with said liquid coolant to adiabatically cool said mist, said liquid coolant being pressurized within the nozzle means to achieve a relatively high rate of speed upon exiting said nozzle means prior to introduction into said enclosure to create a localized area of low pressure at each said perforation so as to suction outside air into said enclosure for facilitating said adiabatic cooling, said mist, in combination with said countercurrent flow of air, thereafter being transformed into a low temperature turbulent fog before said streams and droplets pass through said fog; and
(f) means for collecting said droplets after said droplets pass through said fog, said droplets thereby becoming solidified.

6. A method for producing a granular, spherically shaped product of corrosive, subliming substances as set forth in claim 1 which further comprises directing said molten subliming substance into said enclosure through an upper central part thereof.

7. A method for providing a granular, spherically shaped product of corrosive, subliming substances as set forth in claim 1 which further comprises extracting a mixture of said low temperature fog and vapors of the subliming substance from an upper portion of said enclosure.

8. A method for producing a granular, spherically shaped product from molten iodine, which method comprises:

discharging said iodine, in a molten condition, through a perforated surface or through nozzles and into a tower, so as to form a plurality of molten streams which transform into droplets of 0.5 to 4.0 mm diameter, said tower surrounding said streams and formed droplets and provided around its outer periphery with from 3 to 8 evenly spaced perforations per each meter of height;

introducing, through a bottom portion of said tower, a flow of air into said tower, said flow traveling in a direction countercurrent to said streams and droplets to facilitate cooling of said iodine;

introducing, at a plurality of said perforations substantially surrounding a substantial portion of the vertical axis of said tower, a mist of water, said mist being distributed throughout substantially the entire height of the tower in the form of liquid particles atomized to a size of 10 to 200 $\mu$, said mist being introduced from the outside into the tower through said perforations so as to be cooled adiabatically by mixing with the external air, wherein said atomized liquid particles are pressurized to achieve a relatively high rate of speed prior to entry into said tower to create a localized area of low pressure at each said perforation so as to suction outside air into said tower for facilitating said adiabatic cooling, whereupon said mist, in combination with said countercurrent flow of air, is thereafter transformed into a low temperature turbulent fog by partial evaporation of the incoming liquid particles forming said mist before said droplets pass through the fog;

solidifying said iodine droplets to form spherically shaped particles of said iodine; and collecting said spherically shaped iodine particles, said spherically shaped iodine particles being substantially free of water.

* * * * *